(12) United States Patent
Qiu et al.

(10) Patent No.: US 12,467,752 B2
(45) Date of Patent: Nov. 11, 2025

(54) CLOSED LOOP OPERATION OF BROADBAND RESONATOR OPTICAL GYROSCOPE USING SAWTOOTH PHASE MODULATIONS

(71) Applicant: Honeywell International Inc., Charlotte, NC (US)

(72) Inventors: Tiequn Qiu, Glendale, AZ (US); Jianfeng Wu, Tucson, AZ (US); Matthew Wade Puckett, Phoenix, AZ (US); Steven Tin, Edina, MN (US); Glen A. Sanders, Scottsdale, AZ (US)

(73) Assignee: Honeywell International Inc., Charlotte, NC (US)

( * ) Notice: Subject to any disclaimer, the term of this patent is extended or adjusted under 35 U.S.C. 154(b) by 189 days.

(21) Appl. No.: 18/341,281

(22) Filed: Jun. 26, 2023

(65) Prior Publication Data

US 2024/0426610 A1 Dec. 26, 2024

(51) Int. Cl.
*G01C 19/72* (2006.01)
*G02F 1/01* (2006.01)

(52) U.S. Cl.
CPC ......... *G01C 19/722* (2013.01); *G02F 1/0121* (2013.01); *G02F 2203/15* (2013.01)

(58) Field of Classification Search
CPC .... G01C 19/72; G01C 19/721; G01C 19/722; G01C 19/725; G01C 19/727
See application file for complete search history.

(56) References Cited

U.S. PATENT DOCUMENTS

| | | | |
|---|---|---|---|
| 4,299,490 A * | 11/1981 | Cahill | G01C 19/726 |
| | | | 356/464 |
| 4,811,613 A * | 3/1989 | Phillips | G01C 19/08 |
| | | | 74/5.6 D |
| 5,237,387 A | 8/1993 | Sanders | |
| 5,627,644 A | 5/1997 | Sanders | |

(Continued)

FOREIGN PATENT DOCUMENTS

| | | | | |
|---|---|---|---|---|
| CN | 109959372 A | * | 7/2019 | G01C 19/664 |
| CN | 112697124 A | | 4/2021 | |

(Continued)

OTHER PUBLICATIONS

English translation of CN 115112111 A. Obtained from Espacenet on Feb. 25, 2025. (Year: 2025).*

(Continued)

*Primary Examiner* — Michael A Lyons
(74) *Attorney, Agent, or Firm* — Fogg & Powers LLC (57) ABSTRACT

Various examples of a closed-loop optical gyroscope are disclosed. The closed-loop optical gyroscope includes a broadband light source configured to generate broadband optical signal(s). The broadband optical signal(s) propagate in an optical resonator and are coupled in and out of the optical resonator by optical couplers. A phase modulator applies phase modulation to the optical signal(s) based on a sawtooth modulation signal. The optical signal(s) repropagate in the optical resonator in a different direction. The optical signal(s) are then received and analyzed to determine parameter(s) of the phase modulator. One or more processors configure the phase modulator based on the determined parameter(s).

18 Claims, 5 Drawing Sheets

(56) References Cited

U.S. PATENT DOCUMENTS

| | | | |
|---|---|---|---|
| 6,046,810 A * | 4/2000 | Sanders | G01C 19/72 356/459 |
| 7,362,443 B2 | 4/2008 | Sanders et al. | |
| 7,522,284 B2 | 4/2009 | Sanders et al. | |
| 2008/0079947 A1* | 4/2008 | Sanders | G01C 19/727 356/461 |

FOREIGN PATENT DOCUMENTS

| | | |
|---|---|---|
| CN | 115112111 A | 9/2022 |
| EP | 0416531 A2 | 3/1991 |
| RU | 2198380 C2 * | 2/2003 |

OTHER PUBLICATIONS

European Patent Office, "Extended European Search Report", dated Oct. 30, 2024, from U.S. Appl. No. 18/341,281, from Foreign Counterpart to U.S. Appl. No. 18/341,281, pp. 1 through 9, Published: EP.

Ebberg et al., "Closed-loop fiber-optic gyroscope with a sawtooth phase-modulated feedback", Optics Letters, vol. 10, No. 6, Jun. 1985, pp. 300 through 302.

Hotate et al., "Resonator Fiber Optic Gyro Using Digital Serrodyne Modulation", Journal of Lightwave Technology, vol. 15, No. 3, Mar. 1997, pp. 466 through 473.

Jin et al., "Closed-loop resonant fiber optic gyro with an improved digital serrodyne modulation", Optics Express, Oct. 28, 2013, vol. 21, No. 22, pp. 26578 through 26588.

Liu et al., "Closed-loop Resonant Fiber-Optic Gyroscope based on a broadband source", 2022 20th International Conference on Optical communications and Networks (ICOCN), as downloaded on Mar. 10, 2023 from EEEE Xplore, pp. 1 through 3.

Liu et al., "Performance of a resonant fiber-optic gyroscope based on a broadband source", Applied Optics, Jun. 2022, vol. 61, No. 16, May 27, 2022, pp. 4971 through 4979.

Zhao et al., White-light-driven resonant fiber-optic gyro based on round trip filtering scheme, Optics Letters, vol. 47, No. 5, Mar. 1, 2022, pp. 1137 through 1140.

Zhu et al. "Combined frequency-locking technology of a digital integrated resonator optic gyroscope with a phase-modulated feedback loop", Applied Optics, vol. 58, No. 36, Dec. 20, 2019, pp. 9914 through 9920.

* cited by examiner

CLOSED LOOP OPERATION OF BROADBAND RESONATOR OPTICAL GYROSCOPE USING SAWTOOTH PHASE MODULATIONS

BACKGROUND

Resonator fiber optic gyroscopes (RFOGs) typically utilize narrow linewidth laser sources to generate the optical signals necessary for rotation rate measurements. An RFOG generally operates by propagating the optical signals generated by the laser through an optical resonator in counter-propagating directions. The resonance frequencies of the optical resonator are frequency-shifted due to the Sagnac effect when the RFOG experiences a rotation about its sense axis; this frequency-shift of the resonance frequencies can then be used to determine the extent of rotation experienced by the RFOG.

SUMMARY

The details of one or more embodiments are set forth in the description below. The features illustrated or described in connection with one exemplary embodiment may be combined with the features of other embodiments. Thus, any of the various embodiments described herein can be combined to provide further embodiments. Aspects of the embodiments can be modified, if necessary to employ concepts of the various patents, applications and publications as identified herein to provide yet further embodiments.

In one example, a closed-loop optical gyroscope is disclosed. The closed-loop optical gyroscope comprises a broadband light source configured to generate an optical signal having a broadband frequency range. The closed-loop optical gyroscope comprises a first optical coupler of an optical resonator coupled to the broadband light source and configured to couple the optical signal into the optical resonator. The optical signal propagates in a first direction through the optical resonator. The closed-loop optical gyroscope comprises a second optical coupler of the optical resonator coupled to the first optical coupler. The second optical coupler is configured to couple the optical signal out of the optical resonator. The closed-loop optical gyroscope comprises a phase modulator coupled to the second optical coupler. The phase modulator is configured to generate a phase-modulated optical signal from the optical signal based on a sawtooth modulation signal. The second optical coupler is configured to provide the phase-modulated optical signal back into the optical resonator. The phase-modulated optical signal propagates in a second direction different from the first direction through the optical resonator to the first optical coupler. The first optical coupler is configured to couple the phase-modulated optical signal out of the optical resonator. The closed-loop optical gyroscope comprises a control servo coupled to the first optical coupler and the phase modulator. The control servo is configured to receive a signal corresponding to the phase-modulated optical signal from the first optical coupler and configured to adjust at least one parameter of the phase modulator based on the received signal.

In another example, a system is disclosed. The system comprises a broadband light source configured to generate an optical signal having a broadband frequency range. The system comprises a first optical coupler of an optical resonator coupled to the broadband light source and configured to couple the optical signal into the optical resonator. The optical signal propagates in a first direction through the optical resonator. The system comprises a second optical coupler of an optical resonator coupled to the first optical coupler. The second optical coupler is configured to couple the optical signal out of the optical resonator. The system comprises a phase modulator coupled to the second optical coupler. The phase modulator is configured to generate a phase-modulated optical signal from the optical signal based on a sawtooth modulation signal. The second optical coupler is configured to provide the phase-modulated optical signal back into the optical resonator. The phase-modulated optical signal propagates in a second direction different from the first direction through the optical resonator to the first optical coupler. The first optical coupler is configured to couple the phase-modulated optical signal out of the optical resonator. The system comprises at least one processor coupled to the first optical coupler and the phase modulator. The at least one processor is configured to receive a signal corresponding to the phase-modulated optical signal from the first optical coupler and configured to adjust at least one parameter of the phase modulator based on the received signal.

In yet another example, a method for operating a closed-loop optical gyroscope is disclosed. The method comprises generating an optical signal having a broadband frequency range. The method comprises coupling the optical signal into an optical resonator. The optical signal propagates in a first direction through the optical resonator; coupling, The method comprises coupling the optical signal out of the optical resonator. The method comprises modulating the optical signal with a sawtooth modulation signal to generate a phase-modulated optical signal. The method comprises coupling the phase-modulated optical signal back into the optical resonator. The phase-modulated optical signal propagates in a second direction through the optical resonator different from the first direction. The method comprises coupling the phase-modulated signal out of the optical resonator. The method comprises receiving a signal corresponding to the phase-modulated optical signal. The method comprises adjusting at least one parameter of the phase modulator based on the received signal.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, as briefly described below and as particularly described in the detailed description.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Signals generated by narrow linewidth lasers in RFOGs are generally more susceptible to the optical Kerr effect, which is a nonlinear optical phenomenon that modifies the propagation properties of the optical signal as a function of the intensity of the optical signal. A broadband laser (that is, a broad linewidth source that generates optical signals having a broadband frequency range) may reduce the optical Kerr effects present in the RFOG, but also introduces an additional problem in the RFOG: the broadband nature of the laser source and the narrow resonance peaks of the optical resonator may cause the output intensity of the optical signals to substantially decrease after propagating through the optical resonator. As a result, the output signals may be too weak for the detection and processing circuitry to determine the rotation rate.

One option to overcome the losses from implementing a broadband light source is to utilize an acousto-optic modulator (AOM) in an open-loop gyroscope configuration. While operable, this approach is not suitable for certain applications. For example, AOMs are bulky and expensive devices, making them ill-suited for integrated photonics-based gyroscopes or other small scale RFOG designs. Acousto-optic modulation may also lack the performance needed for more precise applications of optical gyroscopes.

Embodiments of the present disclosure improve on the RFOG architecture. In particular, embodiments of the present disclosure utilize closed-loop operation of an RFOG with adaptive sawtooth phase modulation. As a result, the RFOG can compensate for power losses in the optical resonator, and maintain a substantially constant power response for stable rotation rate determination. Such a system can operate in a closed loop operation and maintain the scale factor linearity.

Figure 1:
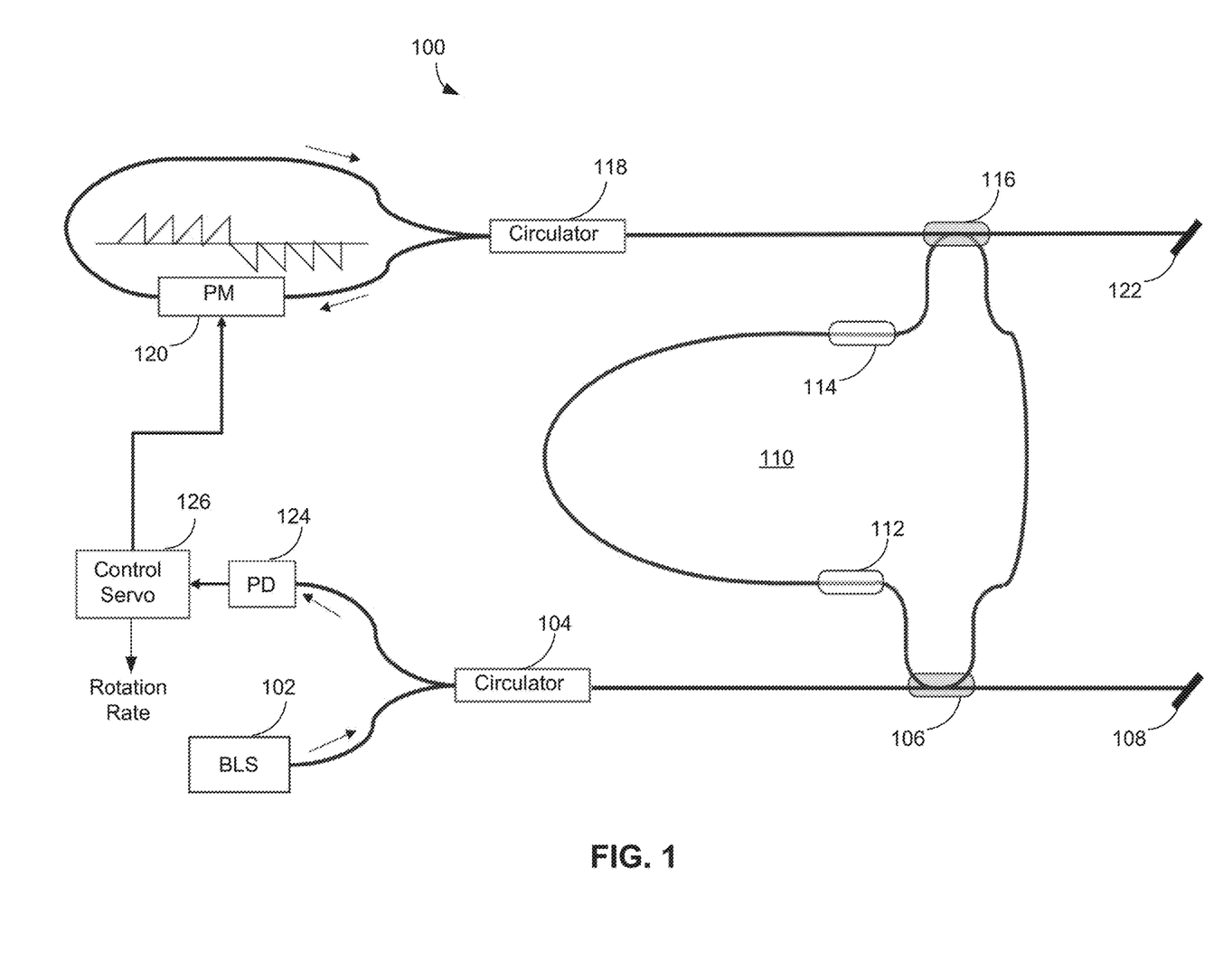
FIG. 1 depicts a block diagram of an exemplary closed-loop optical gyroscope, as described in one or more embodiments.

FIG. 1 depicts a block diagram of an exemplary optical gyroscope, indicated generally by 100. Optical gyroscope 100 includes various components, including a broadband light source (BLS) 102, circulator 104, optical coupler 106, optical resonator 110, optical coupler 116, circulator 118, phase modulator 120, and control servo 126. Although not specifically labelled in FIG. 1, the components of the optical gyroscope 100 are coupled via suitable guided optics. For example, the components of the optical gyroscope 100 can be coupled via optical waveguides and/or free space optics such as lenses, mirrors, and beamsplitters. The optical gyroscope 100 in some examples is implemented on an integrated photonics substrate, such as a photonics chip.

Optical gyroscope 100 generally operates by propagating optical signals through different optical pathways, where they are ultimately processed to determine a rotation rate experienced by the gyroscope. The optical signals are initially generated by broadband light source 102 at a broadband frequency range. In some examples, broadband light source 102 is a broadband laser configured to generate optical signals via amplified spontaneous emission (ASE). As a result, the optical signals generated by broadband light source 102 have a broad spectral linewidth and low coherence. In some examples, the broadband light source 102 generates signals at a selected frequency/wavelength range or intensity that reduces the effects from the optical Kerr effect negligible or renders such effects negligible.

In the example shown in FIG. 1, the optical signals generated by the broadband light source 102 are provided to a circulator 104. Circulator 104 is configured to provide received signals to different optical pathways depending on the signals that are received. For the optical signals generated by broadband light source 102, circulator 104 provides them to an optical coupler 106. Optical coupler 106 is configured to couple at least a portion of the optical signals into the optical resonator 110. The optical waveguide is angle-cleaved at element 108 to prevent back reflection of the portion of the optical signals that are not transmitted into the optical resonator 110, so that these signals do not interfere with the other signals that are received by the optical coupler 106 (including the optical signals generated by broadband light source 102 and the phase-modulated optical signals, as further described herein).

Optical resonator 110 functions to pass a portion of the coupled optical signals at one or more resonance frequencies of the optical resonator. When optical coupler 106 receives the optical signals from circulator 104, it enables the optical signals to propagate in a first direction in the optical resonator 110. In the example shown in FIG. 1, the optical signals coupled by optical coupler 106 propagate in the counter-clockwise (CCW) direction; however, in other examples the optical gyroscope 100 can be designed such that the optical signals propagate initially in the clockwise (CW) direction. As the optical signals propagate in the optical resonator, some frequency components of the optical signals (particularly frequency components that are not near the resonance frequency of the optical resonator) will interfere destructively and not resonate. Thus, the frequency components of the optical signals that correspond to the resonance frequenc(ies) of the optical resonator 110 will get transmitted to the output port, while other components will not.

To reduce the rate measurement error, the optical resonator 110 can include polarizers configured to filter out portions of the optical signals that correspond to undesirable polarization states. For example, in the example shown in FIG. 1, optical resonator 110 includes a polarizer 114 configured to filter out portions of the optical signals that correspond to unwanted polarization modes of the optical resonator 110. As a result, only the portion of the optical signals that correspond to a selected polarization mode of the optical resonator 110 are allowed to pass through the polarizer 114, and will get transmitted through each round trip through the optical resonator 110.

After propagating through the optical resonator 110, a portion of the optical signals are coupled out of the optical resonator 110 via optical coupler 116. The optical signals are then provided to a circulator 118, and subsequently to phase modulator 120. Phase modulator 120 is configured to modulate the phase of the optical signals based on a modulation signal that is applied on the optical signals. Specifically, phase modulator 120 is configured to generate phase-modulated optical signals using a sawtooth modulation signal. The sawtooth modulation signal comprises a periodic sawtooth waveform as further described in the context of FIGS. 2-3. In some examples, phase modulator 120 is an electro-optic phase modulator. Utilizing such a phase modulator simplifies the architecture of the optical gyroscope 100 and reduces the size and cost of implementing frequency shifting of the optical signals.

Once modulated by phase modulator 120, the modulated optical signals (referred to as "phase-modulated optical signals") propagate in the reverse direction. After modulation, the phase-modulated optical signals are provided to circulator 118, which then passes the phase-modulated optical signals back to optical coupler 116. Optical coupler 116 is configured to couple at least a portion of the phase-modulated optical signals into optical resonator 110. While some of the signal intensity is coupled into the optical resonator, a residual amount of signal is angle-cleaved at element 122.

Optical coupler 116 couples the phase-modulated optical signals in a second direction through the optical resonator 110. In the example shown in FIG. 1, the phase-modulated optical signals propagate in the CW direction. The phase-modulated optical signals with frequency components corresponding to a resonance peak of the optical resonator 110 propagate through the optical resonator 110, while non-resonance frequency components are rejected. In the example shown in FIG. 1, the optical resonator 110 also includes a polarizer 112 configured to filter out unwanted polarization modes of the optical resonator 110. As a result, only the portion of the phase-modulated optical signals that correspond to a selected polarization mode of the optical resonator 110 pass through the polarizer 114, and will be coupled out of the optical resonator 110.

After propagating through optical resonator 110, optical coupler 106 is configured to couple a portion of the phase-modulated optical signals out of the optical resonator 110, where they are directed to circulator 104. Since the phase-modulated optical signals are propagating in a direction towards the broadband light source 102, circulator 104 acts as an isolator to prevent the phase-modulated signals from propagating back to the broadband light source 102. The phase-modulated optical signals instead propagate from circulator 104 to photodetector 124. Photodetector 124 is configured to convert the phase-modulated optical signals from an optical signal to a corresponding electrical signal, based on the power of the received signals. The electrical counterpart of the phase-modulated optical signals is then provided to a control servo 126.

To determine the rotation rate, control servo 126 includes, or is coupled to, one or more processors (described as a single processor for brevity). For example, the processor can demodulate the electrical signal and determine the resonance frequency shift based on the power of the demodulated signal corresponding to the phase-modulated optical signal. For example, the received signal can be indicative of a power difference corresponding to a change in rotation rate. The power can be used to adjust the slope of the sawtooth modulation signal, and the slope difference between two successive peaks of the sawtooth modulation signal can be used to determine the frequency shift. The processor can then determine the rotation rate based on the frequency shift.

As shown in FIG. 1, the optical gyroscope 100 is a closed-loop optical gyroscope because the output from the optical resonator 110, indicative of a rotation rate, is also used as feedback to adjust the operation of the phase modulator 120 (wherein the "closed-loop" comprises the propagation of signals from the phase modulator 120 to, ultimately, the control servo 126 and the control signals input to the phase modulator 120). In particular, control servo 126 includes control circuitry configured to adjust the operation of phase modulator 120 based on the electrical signal from the photodetector 124. In some examples, the control servo 126 configures at least one parameter of the phase modulator 120, such as the characteristics of the sawtooth modulation signal used by the phase modulator 120 to modulate the optical signals. For example, as previously described, the control servo 126 is configured to adjust the slope(s) of the sawtooth modulation signal based on a power fluctuation determined from the received electrical signal. The control servo 126 can send control signals that configure the phase modulator 120. In response to receiving the control signals to adjust the slope of the sawtooth modulation signal, the phase modulator 120 generates an adjusted sawtooth modulation signal with the slope of the waveform corresponding to the parameters set by the control servo 126. For example, the phase-modulated optical signal can have a frequency shift that corresponds to the shifted resonance frequency of the optical resonator 110 due to rotation. In this way, the optical gyroscope 100 (and in particular the control servo 126) can compensate for power fluctuations in the average power of phase-modulated optical signals that are detected by the control servo 126.

Figure 2:
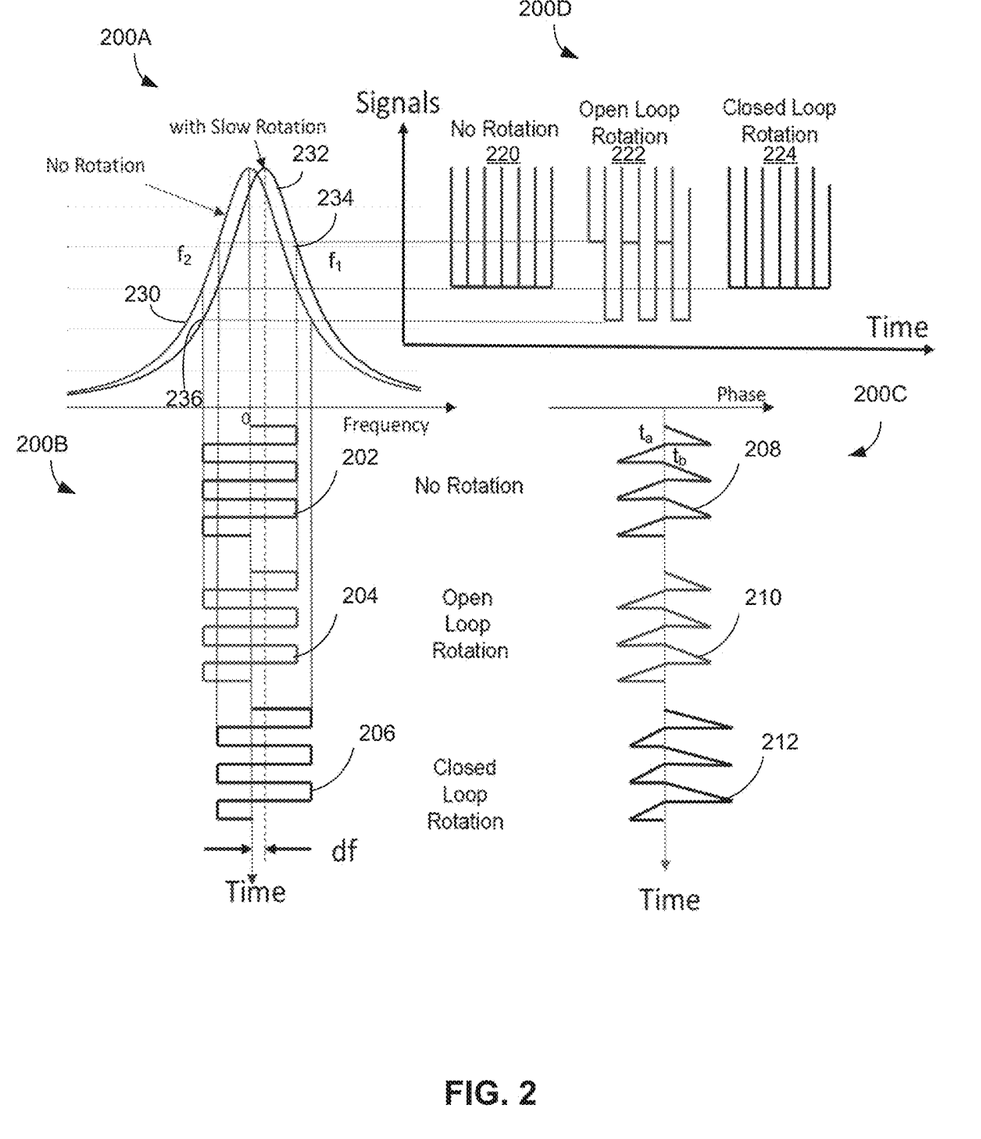
FIGS. 2-3 depicts graphical representations of various modulation schemes applied to an optical signal in an optical gyroscope, as described in one or more embodiments.
Figure 3:
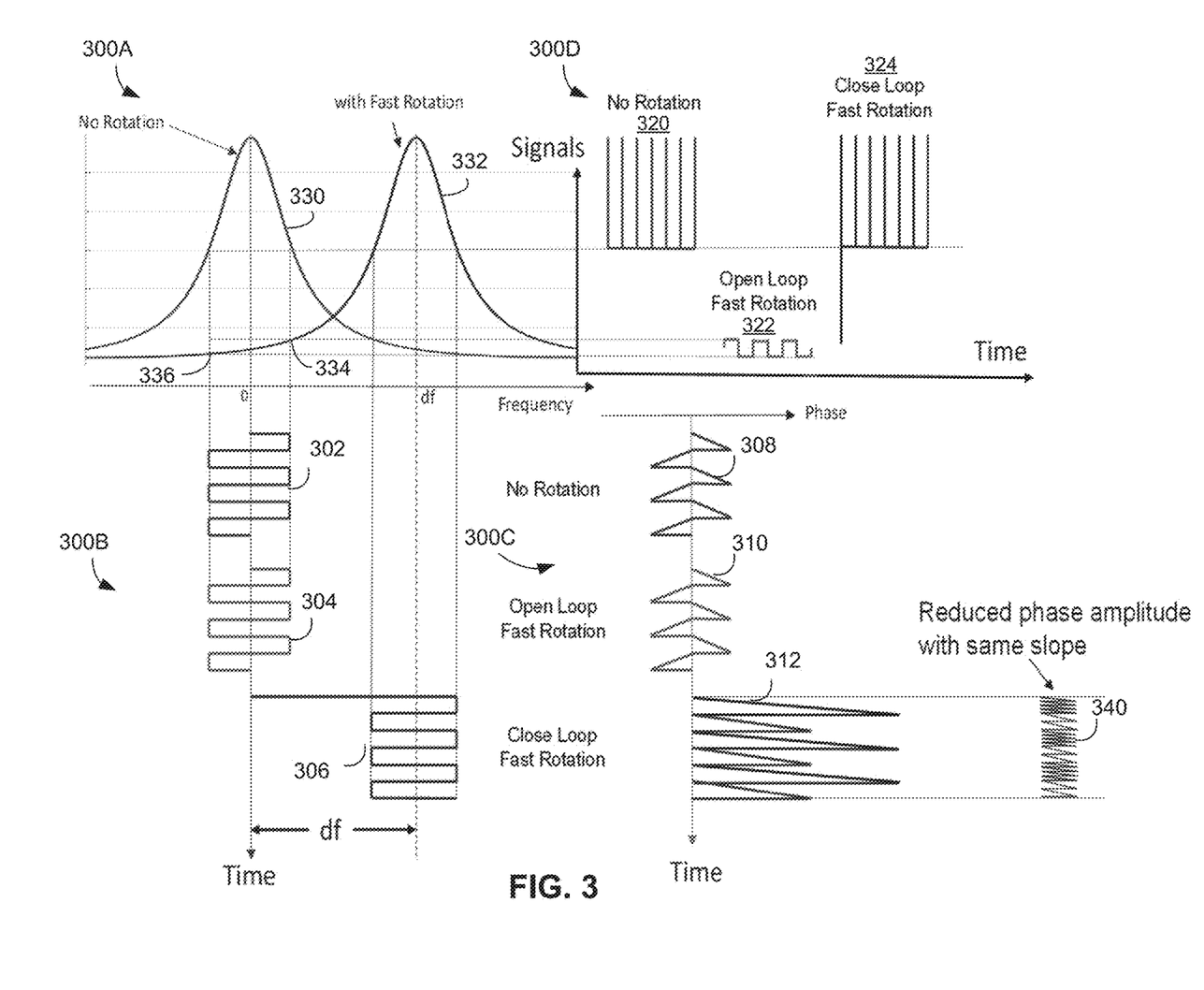

FIGS. 2-3 depict graphical representations of various modulation schemes applied to an optical signal in an optical gyroscope. FIG. 2 depicts a modulation scheme applied to an optical signal corresponding to a slow rotation rate, while FIG. 3 depicts a modulation scheme applied to an optical signal corresponding to a fast rotation rate.

Referring to FIG. 2, four graphical representations are shown. Graph 200A depicts the output intensity as a function of frequency for two curves 230, 232, with the peak of each curve 230, 232 corresponding to a resonance frequency of the optical resonator 110. The first curve 230 of graph 200A represents the resonance power output of the optical signal when there is no rotation. Conversely, second curve 232 of graph 200A represents the resonance power output of the optical signal when there is a slow rate of rotation about the sense axis of the optical gyroscope. Both curves 230, 232 approximate a bell-shaped curve. As shown in graph 200A, there is a shift in the frequency of the maximum values between the two curves 230, 232, which correspond to a shift in the resonance frequency of the optical resonator when the optical gyroscope experiences rotation. Also, while not explicitly shown in graph 200A, each curve 230, 232 can comprise multiple peaks periodically spaced in frequency, where the frequency difference between two adjacent frequency peaks of the same curve referred to as the free spectral range. Only one frequency peak is shown for each curve 230, 232 in graph 200A for pedagogical explanation.

Graph 200B shows three different frequency modulation waveforms: waveform 202 (corresponding to no rotation, i.e., the reference waveform), waveform 204 (corresponding to slow rotation observed by an open-loop configuration), and waveform 206 (corresponding to slow rotation observed by a closed-loop configuration). For each respective waveform 202, 204, 206, the horizontal axis represents the frequency relative to the origin (the origin corresponding to the resonance frequency of the optical resonator when no rotation is observed), and the vertical axis represents the time associated with each frequency. To note, the vertical axis for graph 200B is defined specific to each respective waveform 202, 204, 206, and not relative to each other (for example, waveform 202 corresponding to no rotation is not shown to occur before the waveform 204 corresponding to open-loop rotation). Rather, each distinct waveform 202, 204, 206 is shown vertically to illustrate and compare the different properties of each waveform.

As shown in graph 200B, each waveform 202, 204, 206 resembles a square wave depicting the frequency modulation that corresponds to the phase modulation applied by the phase modulator 120. The maximum of each waveform 202, 204, 206 corresponds to a designated frequency $f_1$ above the origin of its corresponding curve, while the minimum of each waveform 202, 204, 206 corresponds to a designated frequency $f_2$ below the origin of its corresponding curve. Thus, the difference in amplitude between the maximum and minimum frequencies can be defined based on a frequency interval characterizing the resonance peak of its corresponding curve, for example, the full width at half maximum (FWHM) of the curve.

Now referring to graph 200C, which shows the phase modulation signal applied to the optical signal after exiting the optical resonator. This phase modulation signal is used to modulate the optical signal by the phase modulator 120. For example, waveform 208 is the phase modulation signal that would be applied to the optical signal in the absence of rotation, waveform 210 is the phase modulation signal that would be applied to the optical signal in an open-loop configuration during slow rotation, and waveform 212 is the phase modulation signal that would be applied to the optical signal in a closed-loop configuration during slow rotation. Specifically, graph 200C is similar to graph 200B in that three different waveforms 208, 210, 212 are shown vertically for pedagogical comparison, with the horizontal axis representing the amplitude of the phase modulation and the vertical axis representing time (which, like graph 200B, is defined specific to each respective waveform and not defined absolute for all of the waveforms).

Referring to graph 200C, each waveform 208, 210, 212 can be defined by one or more time periods $t_a$, $t_b$, that represent the periodicity of the phase modulation. In some examples, $t_a$ represents the time associated with a first phase peak, while $t_b$ represents the time associated with a second phase peak. As shown in graph 200C, $t_a=t_b$ for waveforms 208, 210, 212 but in general these can be nonequal. When phase modulation is applied to an optical signal that corresponds to no rotation, the sawtooth modulation signal is shown as waveform 208 in which the phase amplitude $\phi$ varies between a maximum and minimum value. As shown for waveforms 208 and 210, the minimum value of the phase amplitude is equal to the negative amplitude of the maximum value, and the waveforms are symmetric about the zero amplitude axis. The phase modulation applied to generate the waveform 210 is identical to waveform 208 because, in an open-loop configuration, there is no feedback provided to the phase modulator to adjust the extent of phase modulation. In contrast, when rotation is experienced in the closed-loop configuration of FIG. 1, the phase modulation signal is represented by the waveform 212 after adjustment by the control servo 126. For waveform 212, the phase amplitude maximum is greater than the phase amplitude minimum and hence, the sawtooth phase modulation waveform is not symmetric about the zero amplitude axis. As the rotation rate changes, the characteristics of the phase modulation signal can be changed based on the feedback received from the control servo 126. For example, the feedback from the control servo 126 can be used to adjust the slope of the phase modulation waveform 212 when the optical gyroscope experiences a larger rotation rate, as further described in the context of FIG. 3.

In an optical gyroscope, it is advantageous to keep the output signal power constant to limit biases resulting from power fluctuations, or from power levels that can be too high or low for the sensitivity of the detection circuitry. However, when a gyroscope experiences rotation, the power of the optical signals decreases when propagating back into the optical resonator due to the frequency shift in resonance frequency of the optical resonator, particularly in an open-loop configuration. The power output for three different situations is shown in graph 200D, which depicts a graph of the signal amplitude as a function of time based on the curves shown in graph 200A. When there is no rotation, the power output is as shown by waveform 220. To generate the waveform 220, the amplitude of the curve 230 is plotted starting from the origin and shifting the frequency back and forth from its maximum frequency $f_1$ to its minimum frequency $f_2$ (e.g., the interval defined by the FWHM of the curve), thus producing a rectangular output of the amplitude that is repeated for each iteration.

When the optical gyroscope experiences rotation, the power waveform will represent either 222 or 224 depending on the configuration. In an open-loop configuration, the generated waveform is 222, which depicts a power fluctuation between the maximum of one output (corresponding to one side of the curve 232) and the maximum of another output (corresponding to the opposite side of the curve 232). This fluctuation occurs because the frequency intervals used to sample the amplitude is not symmetric in an open-loop configuration that experiences rotation. For example, as shown in graph 200A, the amplitude sampling begins from the origin to point 234 of curve 232 and samples until point 236 of curve 232, where the frequency at point 234 is not equal to the negative of the frequency at point 236. Hence, since the change in amplitude on the right-hand side of curve 232 with respect to the origin is less than the change in amplitude on the left-hand side of curve 232 with respect to the origin, the resultant power waveform 222 will have a power fluctuation.

In contrast, the power waveform 224 from the closed-loop configuration of FIG. 1 maintains (at least substantially) the same power output. This is due to the feedback provided to the phase modulator 120 and the subsequent adjustment of the phase modulation signal that is used to generate the phase-modulated optical signal. Since the phase-modulated optical signal compensates for the resonance frequency shift of the optical resonator, the amplitude from curve 232 is sampled from an interval that is symmetric about its peak (that is, the maximum frequency of the interval is equal to the negative of the minimum frequency), which maintains the constant power output shown in waveform 224, even when the optical gyroscope experiences different magnitudes of rotation about its sense axis. In implementing the closed-loop configuration with dynamic feedback to the phase modulator, the advantages stemming from the use of a broadband light source (e.g., less optical Kerr effects) can be used while compensating for its weaknesses (such as power losses from propagation through the optical resonator).

As the gyroscope experiences different rotation rates, the resonance frequencies of the optical resonator 110 will shift and the power of the phase-modulated optical signal will begin to fluctuate due to a change in the resonance condition. Accordingly, the output power of the phase-modulated optical signal will change according to the new rotation. In some examples, control servo 126 is configured to determine the power of the electrical signal corresponding to the phase-modulated optical signal. Control servo 126, or another processor, can determine the frequency shift based on the power. For example, control servo 126 can determine a change in power from the electrical signal and use the change in power to adjust the slope of the sawtooth phase modulation signal. The slope difference between $t_a$ and $t_b$ can be used to determine the frequency difference between the CW and CCW signals, and hence, the rotation rate experienced by the gyroscope.

Additionally, control servo 126 controls the phase modulation signal applied by the phase modulator 120 based on the power of the electrical signal that is received. Referring to graph 200B, the waveforms 202, 204, and 206 are generated by the time derivative of their respective phase modulation waveforms 208, 210, and 212. Waveform 202 corresponds to curve 208 and represents the waveform when there is no rotation experienced by the optical gyroscope. In an open-loop configuration (i.e., where there is no feedback given to the phase modulator), the frequency-modulated waveform 204 corresponds to the curve 210, and hence, waveforms 202 and 204 are identical in form. This is because the same phase modulation waveform is applied in an open-loop configuration as when there is no rotation. In contrast, waveform 206 corresponds to curve 212 and represents a closed-loop configuration. In such a closed-loop configuration (see FIG. 1), the waveform 206 as shown in FIG. 2 has distinctive properties from waveform 202 when the optical gyroscope experiences rotation. For example, the amplitudes between the two waveforms 202 and 206 are offset by a value df, corresponding to a frequency difference. Therefore, by knowing the slope of the phase modulation applied by the phase modulator 120, the frequency shift can then be determined.

Now referring to FIG. 3, which depicts similar graphical representations of modulation schemes as shown in FIG. 2, but when a fast rotation is experienced by the optical gyroscope. Graphs 300A, 300B, 300C, 300D are similar to their respective counterparts described in FIG. 2, and the influence of fast rotation on each of these graphs will be described in turn.

As shown in graph 300A, when there is a faster rotation experienced by the gyroscope, the two curves 330, 332 will be separated by a greater frequency shift between their respective peaks. In other words, the difference in the resonance peaks of the optical resonator for the CCW and CW directions will be shifted more as the gyroscope experiences faster rotation about its sense axis.

Referring to graphs 300B-300C, the differences between open-loop and closed-loop configurations are more easily shown during fast rotation. Since no feedback is provided to a modulator in an open-loop configuration, the waveform 310 will be identical to the waveform 308 when there is no rotation experienced by the gyroscope. And since the frequency is related to the time differential of the phase, the frequency waveforms 302, 304 will also be identical between a gyroscope that experiences no rotation and a gyroscope in an open-loop configuration, even during fast rotation. But, during fast rotation, the power output in an open-loop configuration may be substantially reduced, as shown by waveform 322. This is attributed to the small amplitude change for curve 332 sampled over the frequency interval for the no rotation curve 330 (that is, from point 334 of curve 332 to point 336 of curve 332), as what would correspond to the phase waveform 308 used in an open-loop configuration. As a result, the waveform 322 may be too small to reliably detect and hence, may affect the accuracy of rotation rate measurements determined by the open-loop gyroscope.

In contrast, the modulation scheme of the closed-loop configuration depicted in FIG. 1 maintains a substantially constant power level even during fast rotation. Referring to graph 300C, the waveform 312 is generated by increasing the slope of the phase modulation applied to the optical signal to generate the phase-modulated optical signal. The waveform 312 applied to the optical signal enables the generation of a phase-modulated optical signal of a frequency that corresponds to the resonance frequency of the optical resonator (as determined from the signal provided to the control servo). The characteristics of the waveform 312 are that the slope of the phase amplitude is increased from the slope of the waveform 212 (corresponding to slow rotation). Additionally, in some examples the phase waveform 312 is not symmetric about the zero amplitude axis and instead each value of the phase amplitude lies in the interval $0<=\phi<=\phi_{max}$. In some examples, when the phase amplitude $\phi$ exceeds a maximum value $\phi_{max}$, the waveform can be generated as shown by waveform 340. This waveform 340 corresponds to a reduced phase amplitude, but maintains the same slope as waveform 312. Since the slope is identical for waveforms 312 and 340, the frequency waveform generated from either of these phase waveforms 312 and 340 will be identical to waveform 306. The frequency difference df is readily determined from the offset between the waveform 306 and waveform 302 (corresponding to the resonance frequency at which there is no rotation). Referring to graph 300D, the power waveform 324 in the closed-loop configuration of FIG. 1 is identical to the power waveform 320 when the gyroscope experiences no rotation, thereby enabling the output power of the gyroscope to be substantially constant even when the gyroscope experiences fast rotation. This is in contrast to the power waveform 322 of an open-loop configuration, which may be substantially reduced due to fast rotation.

Figure 4:
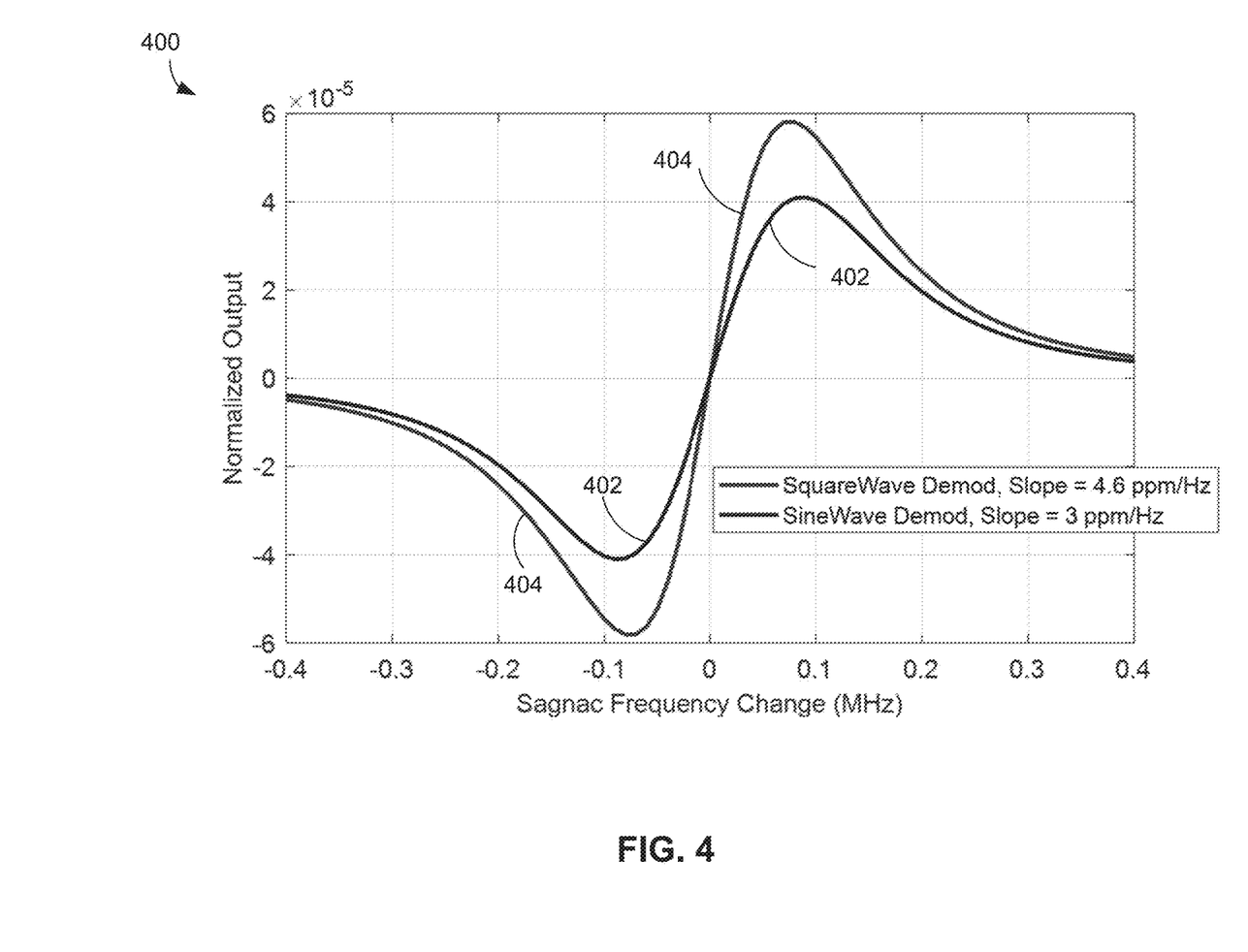
FIG. 4 depicts a graphical representation of sinusoidal and square-wave phase demodulation applied to a phase-modulated optical signal, as described in one or more embodiments.

FIG. 4 depicts a graphical representation 400 of sinusoidal and square-wave phase demodulation applied to a phase-modulated optical signal. Specifically, graph 400 illustrates the normalized output as a function of the Sagnac frequency change (in MHz). Two curves are shown in graph 400, with curve 402 corresponding to output from a sinusoidal demodulation signal and curve 404 corresponding to output from a square wave demodulation signal. Whereas the sinusoidal demodulation signal is used to demodulate a phase-modulated optical signal modulated from a sinusoidal modulation signal, the square wave demodulation signal is used to demodulate the phase-modulated optical signal generated in FIG. 1; that is, a phase-modulated optical signal modulated from a sawtooth modulation signal applied from phase modulator 120.

As shown in FIG. 4, the normalized output of the curve 404 corresponding to square-wave demodulation generally yields a higher normalized output for any frequency change. For a positive frequency change, the normalized output peak reaches approximately $6 \times 10^{-5}$ (greater than the $4 \times 10^{-5}$ output shown by curve 402), whereas for a negative frequency change, the normalized output peak reaches approximately $-6 \times 10^{-5}$ (a greater absolute magnitude than the $-4 \times 10^{-5}$ output reached by curve 402). Accordingly, implementing the sawtooth phase modulation scheme as described in FIGS. 1-3 instead of sinusoidal phase modulation can improve the sensitivity of the gyroscope. As previously described, dynamically adjusting the characteristics of the sawtooth phase modulation in a closed-loop configuration can further improve the detection and stability of the gyroscope.

Figure 5:
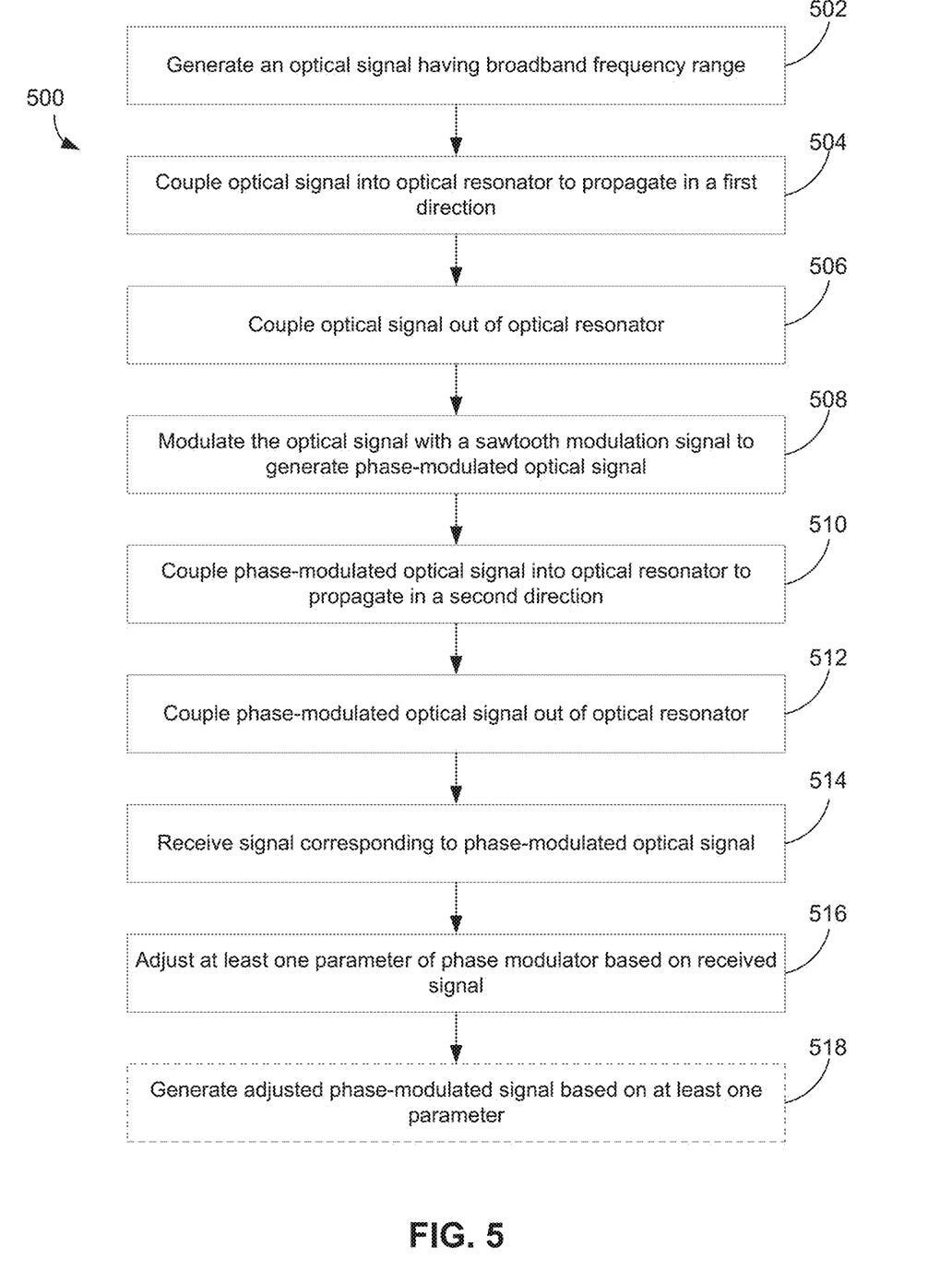
FIG. 5 depicts a flow diagram of an exemplary method for operating a closed-loop optical gyroscope, as described in one or more embodiments.

FIG. 5 depicts a flow diagram of an exemplary method for operating an optical gyroscope. Method 500 may be implemented via the techniques described with respect to FIGS. 1-4, but may be implemented via other techniques as well. The blocks of the flow diagram have been arranged in a generally sequential manner for case of explanation; however, it is to be understood that this arrangement is merely exemplary, and it should be recognized that the processing associated with the methods described herein (and the blocks shown in the Figures) may occur in a different order (for example, where at least some of the processing associated with the blocks is performed in parallel and/or in an event-driven manner).

Method 500 includes generating an optical signal having a broadband frequency range at block 502. For example, an ASE laser or other broadband light source can generate light having a broad spectral linewidth. At block 504, method 500 includes coupling the optical signal into an optical resonator. The function of block 504 can be performed by an optical coupler 106 that receives the broadband optical signal and couples the signal into the optical resonator 110. Once coupled into the optical resonator, the optical signal propagates in a first direction. In the example shown in FIG. 1, the optical signal coupled into the optical resonator 110 from optical coupler 106 propagates in the CCW direction. In propagating through the optical resonator, the optical signal experiences the least amount of attenuation at the resonance frequency of the optical resonator, which may be shifted when the gyroscope experiences rotation.

Method 500 further includes coupling the optical signal out of the optical resonator at block 506. The function of block 506 can be performed by an optical coupler 116 that receives the optical signal from the optical resonator 110 and couples it to an external waveguide. After coupling the optical signal out of the optical resonator, the optical signal is modulated with a sawtooth modulation signal (block 508). In doing so, a phase-modulated optical signal is generated from the optical signal.

Proceeding to block 510, method 500 includes coupling the phase-modulated optical signal into the optical resonator. The function of block 510 can be performed by the optical coupler 116 that receives the phase-modulated optical signal from the phase modulator 120. Once coupled into the optical resonator, the phase-modulated optical signal propagates in a second direction different from the first direction. In the example shown in FIG. 1, the phase-modulated optical signal propagates in the CW direction. After propagating in the optical resonator, the phase-modulated optical signal is coupled out of the optical resonator (block 512), by an optical coupler 106 for example.

Method 500 further includes receiving a signal corresponding to the phase-modulated optical signal at block 514. For example, as shown in FIG. 1, the phase-modulated optical signal is provided to a photodetector 124, which converts the phase-modulated optical signal to an electrical signal and is sent to control servo 126. After the electrical signal is received, method 500 further includes adjusting at least one parameter of the phase modulator based on the received signal (block 516). Block 516 is performed as part of a closed-loop configuration in which feedback is provided to control the phase modulator. In some examples, the control servo can generate control signals to the phase modulator. The at least one parameter can include the parameters of the waveform generated by the phase modulator, such as the slope of the phase modulation signal used by the phase modulator in modulating the optical signal. In some examples, the control servo can control the phase modulator so that the phase modulation that is applied to the optical signal maintains a constant output power even during rotation rate changes. For example, the slope of the adjusted phase modulation signal can be determined as a function of the power or amplitude determined from the received signal, so that the resultant phase-modulated optical signal compensates for the power loss in the optical resonator.

Optionally, method 500 includes generating an adjusted phase-modulated optical signal based on the at least one parameter at block 518. This function is performed by the phase modulator after receiving the control signals from the control servo 126. When the gyroscope experiences faster rotation, the phase modulation signal can be of waveform 312 with a larger slope of the phase amplitude to compensate for the increased rotation rate. During slower rotation, the phase modulation signal can be of waveform 212 with a smaller slope of the phase amplitude. In adjusting the phase modulation signal, the phase modulator then generates the adjusted phase-modulated optical signal that is returned to the optical resonator. The function described at block 518 is optional because, in at least some implementations, there may not be a rotation rate change and hence no need to adjust the phase-modulation applied to the optical signal.

The techniques herein provide a combination of advantages over traditional optical gyroscopes. First, utilizing a broadband light source instead of a narrow linewidth light source reduces the impacts of the optical Kerr effect and optical back scattering. Second, utilizing an electro-optic phase modulator reduces the size and weight requirements of the gyroscope. Third, configuring the resonance detection in a closed-loop configuration compensates for the power loss due to the changing resonance frequencies in the optical resonator during rotation; in particular, feedback control to the phase modulator enables the generation of a substantially constant output power response and stabilizes signals used for rotation rate measurements.

The methods and techniques described herein may be implemented at least in part in digital electronic circuitry, or with a programmable processor (for example, a special-purpose processor or a general-purpose processor such as a computer) firmware, software, or in various combinations of each. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instruction to, a data storage system, at least one input device, and at least one output device. Generally, a processor will receive instructions and data from a read-only memory and/or a random-access memory. Storage devices suitable for tangibly embodying computer program instructions and data include all forma of non-volatile memory, including by way of example semiconductor memory devices, such as erasable programmable read-only memory (EPROM), electrically erasable programmable read-only memory (EE-PROM), and flash memory devices; magnetic disks such as internal hard disks and removable disks; magneto-optical disks; and digital video disks (DVDs). Any of the foregoing may be supplemented by, or incorporated in, specially-designed application specific integrated circuits (ASICs).

Example Embodiments

Example 1 includes a closed-loop optical gyroscope, comprising: a broadband light source configured to generate an optical signal having a broadband frequency range; a first optical coupler of an optical resonator coupled to the broadband light source and configured to couple the optical signal into the optical resonator, wherein the optical signal propagates in a first direction through the optical resonator; a second optical coupler of the optical resonator coupled to the first optical coupler, wherein the second optical coupler is configured to couple the optical signal out of the optical resonator; a phase modulator coupled to the second optical coupler, wherein the phase modulator is configured to generate a phase-modulated optical signal from the optical signal based on a sawtooth modulation signal; wherein the second optical coupler is configured to provide the phase-modulated optical signal back into the optical resonator, wherein the phase-modulated optical signal propagates in a second direction different from the first direction through the optical resonator to the first optical coupler, wherein the first optical coupler is configured to couple the phase-modulated optical signal out of the optical resonator, and a control servo coupled to the first optical coupler and the phase modulator, wherein the control servo is configured to receive a signal corresponding to the phase-modulated optical signal from the first optical coupler and configured to adjust at least one parameter of the phase modulator based on the received signal.

Example 2 includes the closed-loop optical gyroscope of Example 1, wherein the control servo is configured to determine a power of the signal corresponding to the phase-modulated optical signal, wherein the control servo is configured to adjust the at least one parameter of the phase modulator based on the power.

Example 3 includes the closed-loop optical gyroscope of any of Examples 1-2, wherein the control servo is configured to send at least one control signal including the adjusted at least one parameter to the phase modulator, wherein the phase modulator is configured to modulate the optical signal based on the at least one control signal.

Example 4 includes the closed-loop optical gyroscope of any of Examples 1-3, wherein the adjusted at least one parameter includes a slope adjustment of the sawtooth modulation signal.

Example 5 includes the closed-loop optical gyroscope of Example 4, wherein the phase modulator is configured to generate an adjusted phase-modulation signal based on the slope adjustment.

Example 6 includes the closed-loop optical gyroscope of any of Examples 1-5, wherein the phase modulator is configured to reduce an amplitude of the sawtooth modulation signal while maintaining a slope of the sawtooth modulation signal.

Example 7 includes the closed-loop optical gyroscope of any of Examples 1-6, comprising at least one polarizer coupled to an optical path of the optical resonator, wherein the at least one polarizer acts as a filter to pass the optical signal at a first polarization state and attenuates the optical signal at another polarization state.

Example 8 includes a system, comprising: a broadband light source configured to generate an optical signal having a broadband frequency range; a first optical coupler of an optical resonator coupled to the broadband light source and configured to couple the optical signal into the optical resonator, wherein the optical signal propagates in a first direction through the optical resonator; a second optical coupler of the optical resonator coupled to the first optical coupler, wherein the second optical coupler is configured to couple the optical signal out of the optical resonator; a phase modulator coupled to the second optical coupler, wherein the phase modulator is configured to generate a phase-modulated optical signal from the optical signal based on a sawtooth modulation signal; wherein the second optical coupler is configured to provide the phase-modulated optical signal back into the optical resonator, wherein the phase-modulated optical signal propagates in a second direction different from the first direction through the optical resonator to the first optical coupler, wherein the first optical coupler is configured to couple the phase-modulated optical signal out of the optical resonator, and at least one processor coupled to the first optical coupler and the phase modulator, wherein the at least one processor is configured to receive a signal corresponding to the phase-modulated optical signal from the first optical coupler and configured to adjust at least one parameter of the phase modulator based on the received signal.

Example 9 includes the system of Example 8, wherein the at least one processor is configured to determine a power of the signal corresponding to the phase-modulated optical signal, wherein the at least one processor is configured to adjust the at least one parameter of the phase modulator based on the power.

Example 10 includes the system of any of Examples 8-9, wherein the at least one processor is configured to send at least one control signal including the adjusted at least one parameter to the phase modulator, wherein the phase modulator is configured to modulate the optical signal based on the at least one control signal.

Example 11 includes the system of any of Examples 8-10, wherein the adjusted at least one parameter includes a slope adjustment of the sawtooth modulation signal.

Example 12 includes the system of Example 11, wherein the phase modulator is configured to generate an adjusted phase-modulation signal based on the slope adjustment.

Example 13 includes the system of any of Examples 8-12, wherein the phase modulator is configured to reduce an amplitude of the sawtooth modulation signal while maintaining a slope of the sawtooth modulation signal.

Example 14 includes the system of any of Examples 8-13, comprising at least one polarizer coupled to an optical path of the optical resonator, wherein the at least one polarizer acts as a filter to pass the optical signal at a first polarization state and attenuates another polarization state of the optical resonator.

Example 15 includes a method for operating a closed-loop optical gyroscope, comprising: generating an optical signal having a broadband frequency range; coupling, via a first optical coupler, the optical signal into an optical resonator, wherein the optical signal propagates in a first direction through the optical resonator; coupling, via a second optical coupler, the optical signal out of the optical resonator; modulating, via a phase modulator, the optical signal with a sawtooth modulation signal to generate a phase-modulated optical signal; coupling, via the second optical coupler, the phase-modulated optical signal back into the optical resonator, wherein the phase-modulated optical signal propagates in a second direction through the optical resonator different from the first direction; coupling, via the first optical coupler, the phase-modulated signal out of the optical resonator; receiving, at a control servo, a signal corresponding to the phase-modulated optical signal; and adjusting at least one parameter of the phase modulator based on the received signal.

Example 16 includes the method of Example 15, comprising determining a power of the signal corresponding to the phase-modulated optical signal; and adjusting the at least one parameter of the phase modulator based on the power.

Example 17 includes the method of any of Examples 15-16, comprising: adjusting a slope of the sawtooth modulation signal; and generating an adjusted phase modulation signal based on the adjusted slope of the sawtooth modulation signal.

Example 18 includes the method of any of Examples 15-17, comprising: filtering, via at least one polarizer coupled to an optical path of the optical resonator, the optical signal at a first polarization state of the optical resonator; and attenuating the optical signal at another polarization state of the optical resonator.

Example 19 includes the method of any of Examples 15-18, comprising determining a rotation rate based on a slope of the sawtooth modulation signal.

Example 20 includes the method of Example 19, wherein determining the rotation rate comprises: determining a change in power associated with the phase-modulated optical signal; and determining a difference in slope of the sawtooth modulation signal based on the change in power; and determining the rotation rate based on the difference in slope.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A closed-loop optical gyroscope, comprising:
   a broadband light source configured to generate an optical signal having a broadband frequency range;
   a first optical coupler of an optical resonator coupled to the broadband light source and configured to couple the optical signal into the optical resonator, wherein the optical signal propagates in a first direction through the optical resonator;
   a second optical coupler of the optical resonator and coupled to the first optical coupler, wherein the second optical coupler is configured to couple the optical signal out of the optical resonator;
   a phase modulator coupled to the second optical coupler, wherein the phase modulator is configured to generate a phase-modulated optical signal from the optical signal based on a sawtooth modulation signal, wherein the phase modulator is configured to reduce an amplitude of the sawtooth modulation signal while maintaining a slope of the sawtooth modulation signal;
   wherein the second optical coupler is configured to provide the phase-modulated optical signal back into the optical resonator, wherein the phase-modulated optical signal propagates in a second direction different from the first direction through the optical resonator to the first optical coupler,
   wherein the first optical coupler is configured to couple the phase-modulated optical signal out of the optical resonator, and
   a control servo coupled to the first optical coupler and the phase modulator, wherein the control servo is configured to receive a signal corresponding to the phase-modulated optical signal from the first optical coupler and configured to adjust at least one parameter of the phase modulator based on the received signal.

2. The closed-loop optical gyroscope of claim 1, wherein the control servo is configured to determine a power of the signal corresponding to the phase-modulated optical signal, wherein the control servo is configured to adjust the at least one parameter of the phase modulator based on the power.

3. The closed-loop optical gyroscope of claim 1, wherein the control servo is configured to send at least one control signal including the adjusted at least one parameter to the phase modulator, wherein the phase modulator is configured to modulate the optical signal based on the at least one control signal.

4. The closed-loop optical gyroscope of claim 1, wherein the adjusted at least one parameter includes a slope adjustment of the sawtooth modulation signal.

5. The closed-loop optical gyroscope of claim 4, wherein the phase modulator is configured to generate an adjusted phase-modulation signal based on the slope adjustment.

6. The closed-loop optical gyroscope of claim 1, comprising at least one polarizer coupled to an optical path of the optical resonator, wherein the at least one polarizer acts as a filter to pass the optical signal at a first polarization state and attenuates the optical signal at another polarization state.

7. A system, comprising:
   a broadband light source configured to generate an optical signal having a broadband frequency range;
   a first optical coupler of an optical resonator coupled to the broadband light source and configured to couple the optical signal into the optical resonator, wherein the optical signal propagates in a first direction through the optical resonator;
   a second optical coupler of the optical resonator and coupled to the first optical coupler, wherein the second optical coupler is configured to couple the optical signal out of the optical resonator;
   a phase modulator coupled to the second optical coupler, wherein the phase modulator is configured to generate a phase-modulated optical signal from the optical signal based on a sawtooth modulation signal, wherein the phase modulator is configured to reduce an amplitude of the sawtooth modulation signal while maintaining a slope of the sawtooth modulation signal;
   wherein the second optical coupler is configured to provide the phase-modulated optical signal back into the optical resonator, wherein the phase-modulated optical signal propagates in a second direction different from the first direction through the optical resonator to the first optical coupler,
   wherein the first optical coupler is configured to couple the phase-modulated optical signal out of the optical resonator, and
   at least one processor coupled to the first optical coupler and the phase modulator, wherein the at least one processor is configured to receive a signal corresponding to the phase-modulated optical signal from the first optical coupler and configured to adjust at least one parameter of the phase modulator based on the received signal.

8. The system of claim 7, wherein the at least one processor is configured to determine a power of the signal corresponding to the phase-modulated optical signal, wherein the at least one processor is configured to adjust the at least one parameter of the phase modulator based on the power.

9. The system of claim 7, wherein the at least one processor is configured to send at least one control signal including the adjusted at least one parameter to the phase modulator, wherein the phase modulator is configured to modulate the optical signal based on the at least one control signal.

10. The system of claim 7, wherein the adjusted at least one parameter includes a slope adjustment of the sawtooth modulation signal.

11. The system of claim 10, wherein the phase modulator is configured to generate an adjusted phase-modulation signal based on the slope adjustment.

12. The system of claim 7, comprising at least one polarizer coupled to an optical path of the optical resonator, wherein the at least one polarizer acts as a filter to pass the optical signal at a first polarization state and attenuates another polarization state of the optical resonator.

13. A method for operating a closed-loop optical gyroscope, comprising:
- generating an optical signal having a broadband frequency range;
- coupling, via a first optical coupler, the optical signal into an optical resonator, wherein the optical signal propagates in a first direction through the optical resonator;
- coupling, via a second optical coupler, the optical signal out of the optical resonator;
- modulating, via a phase modulator, the optical signal with a sawtooth modulation signal to generate a phase-modulated optical signal, wherein the phase modulator is configured to reduce an amplitude of the sawtooth modulation signal while maintaining a slope of the sawtooth modulation signal;
- coupling, via the second optical coupler, the phase-modulated optical signal back into the optical resonator, wherein the phase-modulated optical signal propagates in a second direction through the optical resonator different from the first direction;
- coupling, via the first optical coupler, the phase-modulated signal out of the optical resonator;
- receiving, at a control servo, a signal corresponding to the phase-modulated optical signal; and
- adjusting at least one parameter of the phase modulator based on the received signal.

14. The method of claim 13, comprising determining a power of the signal corresponding to the phase-modulated optical signal; and adjusting the at least one parameter of the phase modulator based on the power.

15. The method of claim 13, comprising:
- adjusting a slope of the sawtooth modulation signal; and
- generating an adjusted phase modulation signal based on the adjusted slope of the sawtooth modulation signal.

16. The method of claim 13, comprising:
- filtering, via at least one polarizer coupled to an optical path of the optical resonator, the optical signal at a first polarization state of the optical resonator; and
- attenuating the optical signal at another polarization state of the optical resonator.

17. The method of claim 13, comprising determining a rotation rate based on a slope of the sawtooth modulation signal.

18. The method of claim 17, wherein determining the rotation rate comprises:
- determining a change in power associated with the phase-modulated optical signal; and
- determining a difference in slope of the sawtooth modulation signal based on the change in power; and
- determining the rotation rate based on the difference in slope.

* * * * *